Dec. 30, 1969 K. AALAND 3,487,265
PROTECTION CIRCUIT HAVING EXTENDED RANGE FUSE CHARACTERISTICS
Filed Dec. 13, 1967 2 Sheets-Sheet 2
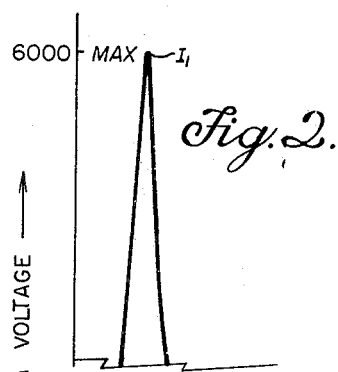
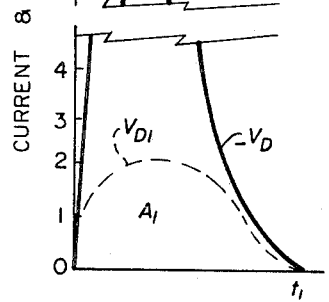
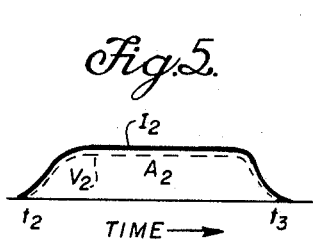
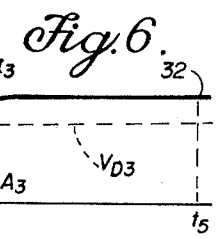
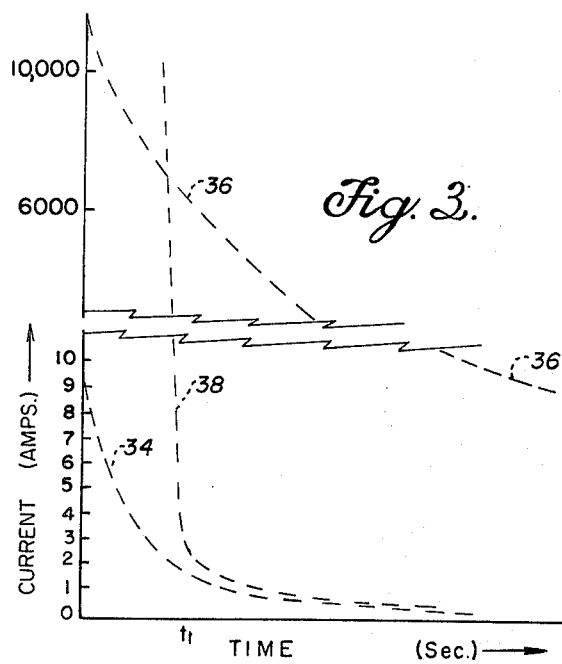
INVENTOR.
KRISTIAN AALAND
BY
ATTORNEY United States Patent Office 3,487,265
Patented Dec. 30, 1969

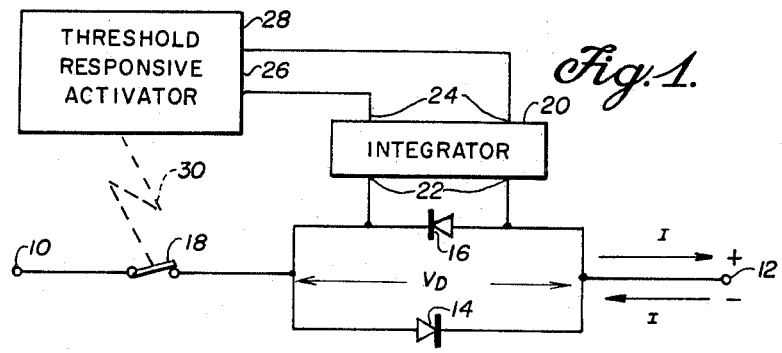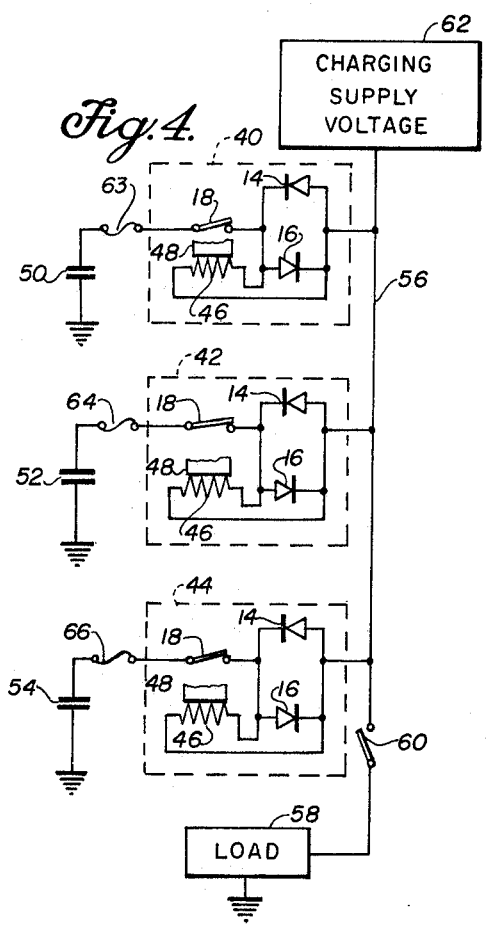

3,487,265
PROTECTION CIRCUIT HAVING EXTENDED
RANGE FUSE CHARACTERISTICS
Kristian Aaland, Livermore, Calif., assignor to the United
States of America as represented by the United States
Atomic Energy Commission
Filed Dec. 13, 1967, Ser. No. 690,290
Int. Cl. H02h 3/28, 5/04, 7/10
U.S. Cl. 317—31                                        5 Claims

ABSTRACT OF THE DISCLOSURE

An electrical line protection circuit including a series diode arranged in the protected line to provide a selected low voltage drop, independent of the line current. By integrating the diode voltage drop and arranging a circuit-breaking switch serially in the line to respond to a selected threshold level of the integrated diode voltage, unique low current protection or fuse characteristics are obtained.

BACKGROUND OF THE INVENTION

The present invention related to electrical circuit protection, and more particularly, to an electrical protection circuit characterized by selective transmission of high current, short duration pulses, together with selective blockage of extended period, low current flow.

There are many applications in the art for a simple, economical and reliable current protection circuit having some of the characteristics of a common fuse, but differentiated therefrom in improved reproducibility, selectivity, and current range. For example, in the art of high energy electrical pulse circuitry involving the discharge of energy-laden capacitor banks, it would be advantageous to provide a serial current-interrupting circuit capable of passing the high current, short duration pulses characteristic thereof, yet being triggered to interrupt a substantially lower current of persistent and continuing flow. In such a case, the latter extended time, low current flow generally accompanies a fault in the circuit, e.g., a partial short, for which protection is desired. It is noted that a conventional melting wire fuse, if constructed to provide substantial thermal inertia, tends to discriminate between high current, short duration pulses and lower current, extended duration flow; however, such fuses are of limited reliability when used to differentiate between various current-time wave-forms. Moreover, the common fuse is generally based on a constant current-time parameter, that is, the fuse will pass only a characteristic current-time quantity of electrical current, thus defining a generally hyperbolic relationship between the current and time, for at least a substantial portion of the fuse range. Where it is desired to provide fuse characteristics deviating from this hyperbolic relationship, the conventional fuse is unsuitable.

SUMMARY OF THE INVENTION

The present invention in general comprises a means for serially interrupting a flow of current automatically in response to a control signal, which signal represents a preselected magnitude of the integral of a non-linear function of the same current. More specifically, the invention comprises a normally closed switching means, at least a first diode serially connected with the switching means with integrating means having an input connected across the diode, including a threshold actuator means for opening the switching means, wherein the actuator means is responsive to an output of the integrating means. An operational current flow through the serially connected diode (in the easy flow direction thereof) and switching means generates across the diode a voltage which is a non-linear function of the current, such that for continually increasing current, a generally maximum diode voltage is developed independent of the current magnitude. As the switching means operates to serially interrupt the circuit only after receipt of a given threshold level of the integral of the diode voltage, the invention operates to pass extremely high currents for short durations, limited only by pulse-current capability of the diode, yet interrupt exceedingly lower currents of longer duration.

Accordingly, it is an object of the present invention to provide an electrical protection circuit having an extended current toleration range for short time durations.

Another object of this invention is to provide a protection circuit exhibiting a high degree of selectivity, and capable of distinguishing between current time waveforms incident to a fault and those incident to normal operation, with a high degree of dependability.

It is a feature and advantage of this invention that the toleration curve for the protection circuit is adjustable.

It is a further feature and advantage of the present invention that the protection circuit exhibits a current time toleration curve wherein the current level approaches infinity for decreasing values of time.

It is an additional and more particular object of the invention to provide a current fault protection circuit suitably adapted for incorporation into a multiple capacitor bank discharge system.

BRIEF DESCRIPTION OF THE DRAWINGS

Further objects, features and advantages of the invention will become apparent upon reading of the following detailed description of the invention, taken in conjunction with the accompanying drawings, wherein:

FIGURE 1 is a schematic and block diagram of a simplified form of the device of the invention.

FIGURES 2, 5 and 6 are current vs. time plots, showing exemplary wave-forms occurring within a device of the invention during operation.

FIGURE 3 is a graphical plot showing a comparison between the current-time toleration curve of the device of the invention and toleration curves of typical prior art fuses.

FIGURE 4 is a schematic diagram of a preferred embodiment of the invention incorporated into a capacitive bank discharge system.

DESCRIPTION OF THE PREFERRED EMBODIMENTS

As shown in FIGURE 1, the current protection circuit of the present invention is connected between a pair of terminals 10 and 12, which in application of the invention correspond to the pair of terminal leads of a conventional fuse. Serially connected between terminals 10 and 12 are a parallel pair of opposingly-poled diode elements 14 and 16 and a normally closed switch 18. An integrator 20 having an input 22 connected across diode elements 14 and 16, and an output 24 connected to an input 26 of threshold-responsive activator 28, is selected to provide a means for integrating the diode voltage, $V_d$, appearing across the diode elements. Activator 28, having a linkage 30 with normally closed switch 18, provides a means for opening switch 18 in response to a preselected threshold output from integrator 20.

In operation, a current flow denoted by, I, flows in either direction between terminals 10 and 12, generating across one of the diode elements 14 or 16, depending upon the flow direction, a forward diode voltage drop, $V_d$, which increases with current flow characteristically up to a generally defined maximum level, whereupon further increasing current has a nominal effect on the voltage $V_d$. Upon integration of this voltage, $V_d$, by integrator 20, which, for example, may be a conventional electronic integrator of the type characterized by an operational amplifier and feedback capacitor, an output signal is provided at 24 representative of the integral $\int V_d dt$, or approximately the product $V_d \times$ time. When the signal representative of such product reaches a preselected threshold level, activator 28 responds thereto, operating linkage 30 and thus opening switch 18. The effect of this operation is to interrupt current flow from terminals 10 to 12, or vice versa, of the character hereinabove described.

It is noted that only one diode is essential for operation of the circuit; however, the current, I, in such a case would be limited to a current flow direction corresponding to the forward direction of the single diode. The opposingly-poled pair of diode elements 14 and 16 shown in FIGURE 1 provide for bidirectional current flow, and is therefore a preferred form of the invention, since, for example, it provides for charge and discharge of the circuit in which it may be employed.

To more fully appreciate and understand the operational characteristics of the circuit shown in FIGURE 1, reference is made to FIGURES 2, 5 and 6, wherein three separate current wave-forms, $I_1$, $I_2$, and $I_3$, are plotted on a common current and voltage vs. time graph. Particularly with regard to FIGURE 2, showing current wave-form $I_1$, where $I_2$ corresponds to the current I ($\pm$) flowing in FIGURE 1, a fast-rising and falling high current pulse is illustrated, reaching a peak at 6,000 amperes, and extending on the time scale from zero to $T_1$. For convenience, the current voltage scale has been broken in segments to show the high current maximum, together with detailed lower order current and voltage wave-forms which are of significance herein. It is noted that for wave-form $I_1$, a corresponding diode voltage drop, $V_{d1}$, as shown in FIGURE 2 generally reaches a maximum level of about 2 volts, even for thousands of amperes of current.

For a low level current wave-form $I_2$, shown in FIGURE 5, a voltage level is reached which is governed by the input impedance of integrator 22, thereby exhibiting a generally linear relationship with $I_2$.

An intermediate, or fault, current is depicted as $I_3$ in FIGURE 6. $V_{d3}$ may reach about 1.5 volts, and deviates from a linear relationship with $I_3$.

Now, as discussed above, the combination integrator 20 and activator 28 provide for opening of switch 18 in response to a selected threshold level of the time integral of the diode voltage $V_d$. Such a time integral is represented in FIGURES 2, 5 and 6 by the areas $A_1$, $A_2$ and $A_3$, which are individually bounded by the diode voltage wave-forms $V_{d1}$, $V_{d2}$ and $V_{d3}$. In other words, switch 18 will open in response to a certain threshold representative area, which in the case of FIGURE 6, area $A_3$ reaches this threshold level, opening switch 18 at a time point 32. In retrospect, it will be appreciated that neither of the representative areas $A_1$ nor $A_2$ shown respectively in FIGURES 2 and 6 is sufficiently large to reach this threshold level. As a result, a current pulse such as $I_1$ will be passed by the circuit of FIGURE 1, while a current flow having the characteristics of $I_3$ will be interrupted, even though $I_1$ has a peak magnitude of several thousand times that of $I_3$. Additionally, the time duration, $0-T_1$, of the current wave-form $I_1$ may approach the time duration, $T_4-T_5$, of the current wave-form $I_3$ so long as the former does not exceed the latter.

In comparison with the foregoing operation, the threshold area required for blowing or opening of a conventional fuse would include the entire area bounded by current wave-form $I_1$. On the other hand, with the device of the present invention, only a small portion, e.g., $A_1$, of this total area bounded by $I_1$ is effective toward opening switch 18.

The operation of the circuit in FIGURE 1 for low levels of current flow, e.g., 1 to 3 amperes, provides a result closely resembling that of the common melting wire fuse. Specifically, as shown in FIGURE 6, the area bounded by current wave-form $I_3$ closely approximates that area bounded by the diode voltage $V_{d3}$, wherein such area or time integral is a measure of the current time duration characteristic required for opening switch 18 in FIGURE 1, and also for blowing a conventional fuse. Thus it may be said that the device of the invention provides an extended current range for relatively short time durations, e.g., $0-T_1$, together with characteristics approximating that of a conventional fuse for longer time periods of current flow.

The effective operation of the circuit in FIGURE 1, which has been exemplified in FIGURES 2, 5 and 6, is diagrammatically illustrated in FIGURE 3. Particularly, FIGURE 3 shows several tolerance curves: a low current conventional melting wire fuse tolerance curve 34; a high current conventional fuse tolerance curve 36; and a tolerance curve 38 exhibited by the device of the present invention. Fuse tolerance curves, in general, are utilized to provide a practical measure of the protection characteristics of fuses, wherein current and application time are represented along orthogonal axes. The current axis in the drawing has been broken so as to illustrate the extended range operation of the present invention. In reading the plots shown by FIGURE 3, each curve indicates on the left lower side thereof an operating range in which the fuse or protection circuit will not be blown or actuated. The upper right hand portions of each curve represent current-time ranges wherein the fuse interrupts the circuit. For example, all of the tolerance curves, 34, 36 and 38, will pass a current waveform having an amplitude of 1 and a time duration of $T_1$, as such a wave-form is lower and to the left of each of the tolerance curves. Now, comparing the tolerance curve 38 provided by the circuit shown in FIGURE 1 with tolerance curve 34 representative of a low current conventional fuse, it will be noted that, for the time duration $0-T_1$, the maximum current is essentially unlimited by curve 38. Contrarywise, curve 34 defines a fixed maximum current of about 10 amperes, regardless of how short the time lapse. However, for times greater than $T_1$, the tolerance curves 34 and 38 closely approach one another. This result, also discussed in connection with FIGURES 2, 5 and 6, shows that the protection circuit of the instant invention will pass, without interruption, infinitely high pulse currents with a time duration, for example in this instance, of $0-T_1$, yet interrupt low level currents which persist for times greater than $T_1$.

Up to this point, integrator 20 and threshold-responsive activator 28, included in the circuit of FIGURE 1, have been characterized only in a general manner. More specifically, the integrator 20 may be any of a large number of electrical components providing integrating characteristics. One example, which has been given above, is the electronic analog integrating circuit including an operational amplifier and feedback capacitor. Also, integrator 20 may be a saturable core reactor, wherein the integration is limited by saturation, yielding accurate circuit tripping points. While these devices would work very satisfactorily, we have also used, with economy and reliability, a thermal resistive element for integrator 20. In such a case, the thermal resistive element is connected in parallel across diodes 14 and 16 of FIGURE 1, and in response to voltage, $V_d$, thereacross, the resistive element heats up and may be used to energize a wide variety of threshold activators, e.g., current breaker switch (not shown), where the thermal energy so provided is proportional to the integral of voltage $V_d$.

In connection therewith, threshold-responsive activator 28 has been embodied by an explosive chemical disposed proximate switch 18, wherein the explosive chemical is ignited by a preselected threshold amount of heat from the thermal resistive element. This embodiment is illustrated in FIGURE 4, wherein a plurality of protection circuits, 40, 42 and 44, are interconnected in series with a multiple capacitor energy storage discharge system. Each of the protection circuits 40, 42 and 44 is of the type illustrated in FIGURE 1, and, more particularly, includes the thermal resistive element 46 as integrator 20 and the chemical explosive 48 for actuating activator 28. The remaining components of the protection circuits including diodes 14 and 16 and normally closed switch 18 correspond to like numbered components of the circuit in FIGURE 1. In the construction of protection circuits 40, 42 and 44, explosive 48 is disposed proximate resistive element 46 and switch 18, such that, as briefly described above, heat generated by element 48 in response to the diode voltage drop ignites explosive 48 at a certain threshold temperature level. The explosive is arranged so that the resulting explosion repulses a movable contact member of switch 18, thereby opening the circuit and interrupting current flow.

Furthermore, the entire circuit shown in FIGURE 4 exhibits unique and advantage current or fault protection characteristics which, in general, allow each of capacitors 50, 52 and 54 to be charged and discharged via a common line bus 56, yet nevertheless providing isolation of the individual capacitors in the event a fault should develop therein. That is, should a short or partial short develop within one of capacitors 50, 52 or 54, an excessive and persistent current flow to the faulty capacitor causes the respective protection circuit to trip and interrupt such current flow, thereby maintaining the charge on the remaining "good" capacitors. Otherwise, in large multiple capacitor energy storage banks, all of the energy in all of the other capacitors can discharge through the faulted capacitor energy storage banks, all of the energy in all explosion of substantial quantities of a chemical high explosive. In order to provide this result, each of the protection circuits 40, 42 and 44 must necessarily be included serially between each capacitor and bus line 56. Otherwise, it will be apparent that no isolation of each separate capacitor is effectuated. This requirement on the disposition of the protection circuits is principally associated with the advantageous current-time tripping characteristics of the instant invention. Particularly, the protection circuits must pass the normal discharge current pulse without interruption, yet trip and open the circuit in the event of a persistent current flow. In the instant case, the discharge current wave-form flowing from each of the capacitors to bus line 56 and load 58 upon closure of switch 60 is of the general shape and magnitude of the current pulse shown in FIGURE 2, i.e., $I_1$. Accordingly, this high current pulse which, typically, is in the kiloampere range and extends over a time period of a few milliseconds, is readily passed by each of circuits 40, 42 and 44. On the other hand, should a partial short develop, for example, in capacitor 50, a current flow from the charging supply voltage 62 would persist long enough to develop sufficient thermal heat in element 46 to ignite explosive 48 and thereby open switch 18. Such a current wave-form would, for example, resemble wave-form $I_3$ in FIGURE 6, wherein the current level would be around 2 amperes and the time duration a few seconds. In considering the operation of the discharge circuit shown in FIGURE 4, reference is made again to FIGURE 3, wherein it is noted that a conventional fuse having a tolerance curve such as curve 34 would not provide the same operation as provided by the instant invention, due to the low level of current tolerance, i.e., 10 amperes, for short time durations.

Referring again to FIGURE 4, an additional feature of the circuit shown therein relates to the use of conventional fuses 63, 64 and 66 in serial combination with protection circuits 40, 42 and 44. Specifically, it may be desired to limit the maximum current flow to or from each of the capacitors to a safe discharge rate level, e.g., approximately 10,000 amperes, such that a faulty capacitor having a complete short causing current flow from the remaining capacitors in excess of 10,000 amperes for short time periods would be interrupted. To provide this result, a fuse having the characteristics of tolerance curve 36 shown in FIGURE 3 would be utilized for each of fuses 63, 64 and 66, wherein it is noted that the 10,000-ampere normal discharge pulse is not sufficient to blow these conventional fuses, yet current in excess thereof will provide such an occurrence.

I claim:
1. An electrical protection circuit actuated by a preselected current-time flow characteristic between an in-input and an output terminal, comprising:
   a non-linear electrical conductor means arranged in serial connection between said input and output, providing a preselected maximum voltage drop thereacross essentially independent of increasing current flow through said means;
   an integrating means responsive to said voltage drop and providing an output signal representative of the time integral of said voltage drop; and
   means for sensing a preselected threshold level of said signal representative of said time integral of said voltage, and thereupon interrupting said serial connection so that said protection circuit selectively passes high currents of short duration, and interrupts substantially lower currents of longer duration of current flow.

2. The circuit of claim 1, wherein said non-linear conductor means comprises a semiconductor rectifier element poled to pass said current flow in the forward direction.

3. The circuit of claim 1, wherein said non-linear conductor means comprises a pair of semiconductor diodes connected in oppositely poled parallel relation, said diodes each having a generally exponential current versus forward voltage characteristic.

4. The circuit of claim 1, further defined by said integrating means comprising a thermal resistive element connected across said non-linear conductor means, and providing heat in proportion to the time integral of said voltage drop; and said means for sensing said threshold comprises a chemical explosive in heat transfer relation to said resistive element and a normally closed switch interposed in said serial connection, said explosive arranged proximate a movable contact arm of said switch, whereby said element generates heat in response to said voltage drop, said heat igniting said explosive and said explosive opening said switch.

5. The apparatus of claim 1, further including a melting wire fuse serially connected with said current protection circuit, wherein said fuse is selected to interrupt the current in response to a given maximum current of very short duration.

References Cited

UNITED STATES PATENTS 2,246,324    6/1941    Schroder _____ 317—31 X
3,157,825   11/1964    Antoszewski et al. ____ 317—36

LEE T. HIX, Primary Examiner

J. D. TRAMMELL, Assistant Examiner

U.S. Cl. X.R.

317—36, 40, 49, 52